(12) United States Patent  
Wei et al.

(10) Patent No.: US 9,304,628 B2  
(45) Date of Patent: Apr. 5, 2016

(54) TOUCH SENSING MODULE, TOUCH SENSING METHOD, AND COMPUTER PROGRAM PRODUCT

(71) Applicant: Wistron Corporation, New Taipei (TW)

(72) Inventors: Shou-Te Wei, New Taipei (TW); Shang-Chin Su, New Taipei (TW); Sheng-Hsien Hsieh, New Taipei (TW)

(73) Assignee: Wistron Corporation, New Taipei (TW)

( * ) Notice: Subject to any disclaimer, the term of this patent is extended or adjusted under 35 U.S.C. 154(b) by 166 days.

(21) Appl. No.: 14/183,538

(22) Filed: Feb. 19, 2014

(65) Prior Publication Data

US 2015/0130768 A1  May 14, 2015

(30) Foreign Application Priority Data

Nov. 13, 2013 (TW) .............................. 102141310 A (51) Int. Cl.
*G06F 3/042* (2006.01)
*G06F 3/041* (2006.01)

(52) U.S. Cl.
CPC ............ *G06F 3/0421* (2013.01); *G06F 3/0416* (2013.01)

(58) Field of Classification Search
CPC ................... G06F 3/03–3/0325; G06F 3/041; G06F 3/042–3/0428; G06F 3/0488–3/04886
See application file for complete search history.

(56) References Cited

U.S. PATENT DOCUMENTS

2012/0181418 A1*  7/2012  Kitagawa .............. G06F 3/0428 250/206.1
2014/0028578 A1*  1/2014  Dinh ................... G06F 3/04883 345/173

* cited by examiner

*Primary Examiner* — Nathan Danielsen
(74) *Attorney, Agent, or Firm* — Jianq Chyun IP Office (57) ABSTRACT

A touch sensing module including a plurality of image sensors and a processing unit is provided. The image sensors are disposed beside a reference plane and configured to detect the reference plane and to convert a detection result into a plurality of image signals respectively. The processing unit is configured to receive and process the image signals from the image sensors. When an object moves with respect to the reference plane in a plurality of first times and intersects or approaches the reference plane in each of the first times, the processing unit selects one first diagonal having the least length variation in the first times from a plurality of first diagonals of a first polygon surrounding the object in each first time to be a first orientation diagonal corresponding to a real orientation of the object. A touch sensing method and a computer program product are also provided.

24 Claims, 7 Drawing Sheets

TOUCH SENSING MODULE, TOUCH SENSING METHOD, AND COMPUTER PROGRAM PRODUCT

CROSS-REFERENCE TO RELATED APPLICATION

This application claims the priority benefit of Taiwan application serial no. 102141310, filed on Nov. 13, 2013. The entirety of the above-mentioned patent application is hereby incorporated by reference herein and made a part of this specification.

BACKGROUND OF THE DISCLOSURE

1. Field of the Disclosure

The disclosure relates to a sensing module, a sensing method, and a computer program product thereof, and more particularly relates to a touch sensing module, a touch sensing method, and a computer program product thereof.

2. Description of Related Art

Due to the convenient and highly-intuitive operation, touch electronic products are popular among the consumers and gradually become the main trend of the market in recent years. Among resistive, capacitive, and rear projection touch screens that have been used for some time, the capacitive touch screen has the best touch performance but it is also the most expensive one. The production costs of the capacitive touch screen increase with its screen size, thus limiting the application.

An optical touch screen that utilizes an optical lens to detect the touched position has been proposed as an alternative to the capacitive touch screen. The optical touch screen has advantages, such as low cost and good accuracy, etc., which is more competitive in the market and thus has also become another option for large-sized touch screens.

Another type of optical touch screen utilizes multiple optical lenses or reflective frames disposed at the edge of the screen to capture images of the operation of the user's finger on the screen and analyze the position of the shadow generated by the finger that blocks light in the captured images, so as to calculate the exact position of the touched point. The cost of disposing the reflective frames is far less than the cost of disposing the optical lenses and thus the reflective frames have advantages in price.

However, these conventional optical touch screens can only determine the position of the center point of the touch object. Therefore, when the touch object moves on the display surface, these optical touch screens can only detect translational motion and cannot determine spin motion of the touch object.

SUMMARY OF THE DISCLOSURE

The disclosure provides a touch sensing module capable of detecting an orientation and a spin motion of an object used for touching.

The disclosure provides a touch sensing method for detecting an orientation and a spin motion of an object used for touching.

The disclosure provides a computer program product capable of detecting an orientation and a spin motion of an object used for touching.

A touch sensing module in an embodiment of the disclosure includes a plurality of image sensors and a processing unit. The image sensors are disposed beside a reference plane and configured to detect the reference plane along an extending direction of the reference plane and convert a detection result into a plurality of image signals, respectively. The processing unit is configured to receive and process the image signals from the image sensors. When an object moves with respect to the reference plane in a plurality of first times and intersects or approaches the reference plane in each of the first times, the processing unit calculates imaging positions of two opposite borders of an object signal portion, which corresponds to the object, of each of the image signals on the corresponding image sensor, converts the imaging positions of the borders of the object signal portions of the image signals to positions of a plurality of first vertexes of a first polygon that surrounds the object on the reference plane by a triangulation location method, and calculates lengths of a plurality of first diagonals of the first polygon based on the positions of the first vertexes. The processing unit selects one first diagonal which has the least length variation in the first times from the first diagonals in each of the first time as a first orientation diagonal corresponding to a real orientation of the object.

A touch sensing method in an embodiment of the disclosure includes: detecting a reference plane along an extending direction of the reference plane in a plurality of detection regions and converting a detection result into a plurality of image signals respectively; when an object moves with respect to the reference plane in a plurality of first times and intersects or approaches the reference plane in each of the first times, calculating imaging positions of two opposite borders of an object signal portion, which corresponds to the object, of each of the image signals on the corresponding detection region, converting the imaging positions of the borders of the object signal portions of the image signals to positions of a plurality of first vertexes of a first polygon that surrounds the object on the reference plane by a triangulation location method, and calculating lengths of a plurality of first diagonals of the first polygon based on the positions of the first vertexes; and selecting one first diagonal which has the least length variation in the first times from the first diagonals in each of the first time as a first orientation diagonal corresponding to a real orientation of the object.

A computer program product in an embodiment of the disclosure is stored in a computer readable recording medium to detect a touch action of an object. The computer program product includes a first program command, a second program command, and a third program command. The first program command includes detecting a reference plane along an extending direction of the reference plane in a plurality of detection regions and converting a detection result into a plurality of image signals respectively. The second program command includes calculating imaging positions of two opposite borders of an object signal portion, which corresponds to the object, of each of the image signals on the corresponding detection region, converting the imaging positions of the borders of the object signal portions of the image signals to positions of a plurality of first vertexes of a first polygon that surrounds the object on the reference plane by a triangulation location method, and calculating lengths of a plurality of first diagonals of the first polygon based on the positions of the first vertexes when the object moves with respect to the reference plane in a plurality of first times and intersects or approaches the reference plane in each of the first times. The third program command includes selecting one first diagonal which has the least length variation in the first times from the first diagonals in each of the first time as a first orientation diagonal corresponding to a real orientation of the object.

According to the touch sensing module, touch sensing method, and computer program product of the embodiments of the disclosure, because the first diagonal having the least length variation in the first times among the first diagonals in each first time is selected as the first orientation diagonal corresponding to the real orientation of the object, the orientation of the object used for touching can be determined accurately. Accordingly, the touch sensing module, touch sensing method, and computer program product of the embodiments of the disclosure achieve various and more convenient applications.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
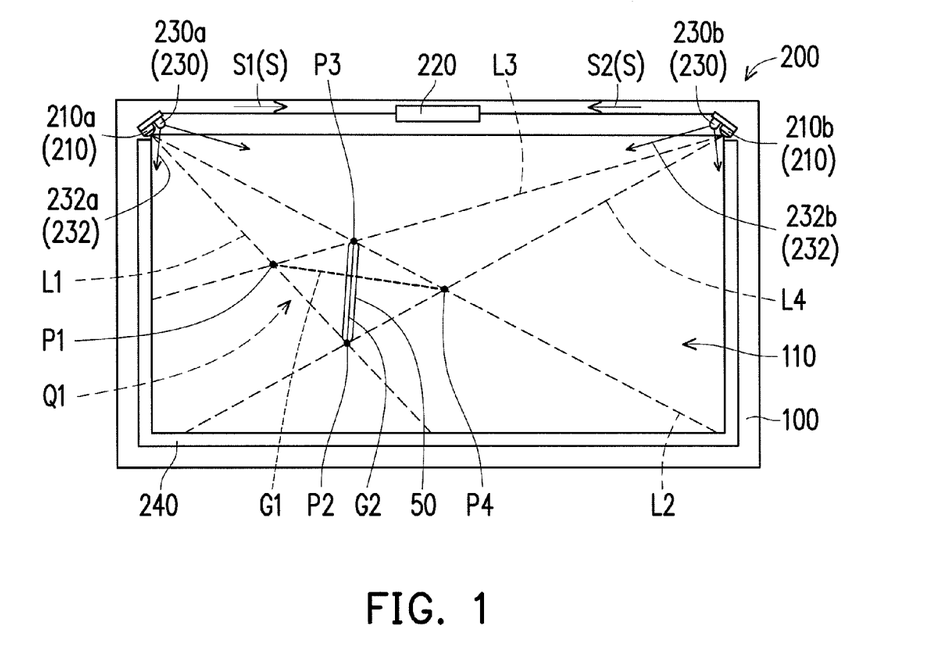
FIG. 1 is a schematic front view of a touch sensing module according to an embodiment of the disclosure.
Figure 2:
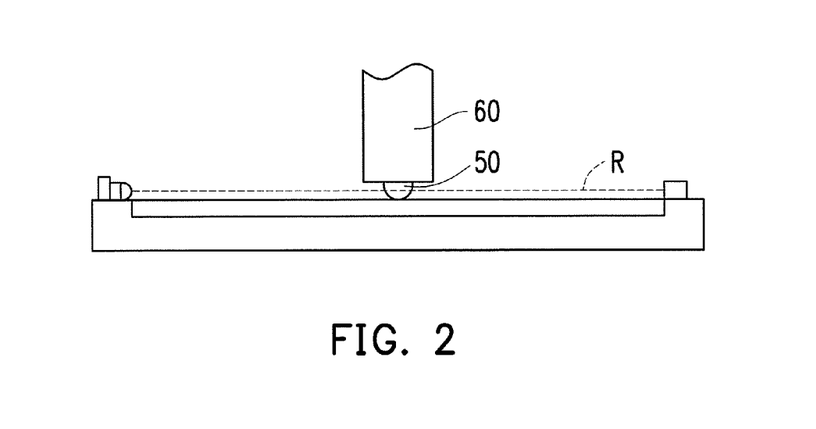
FIG. 2 is a schematic side view of the touch sensing module of FIG. 1.
Figure 3:
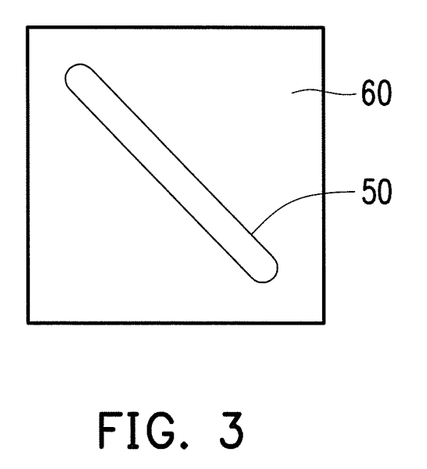
FIG. 3 is a schematic bottom view of an object used for touching in FIG. 1.
Figure 4A:
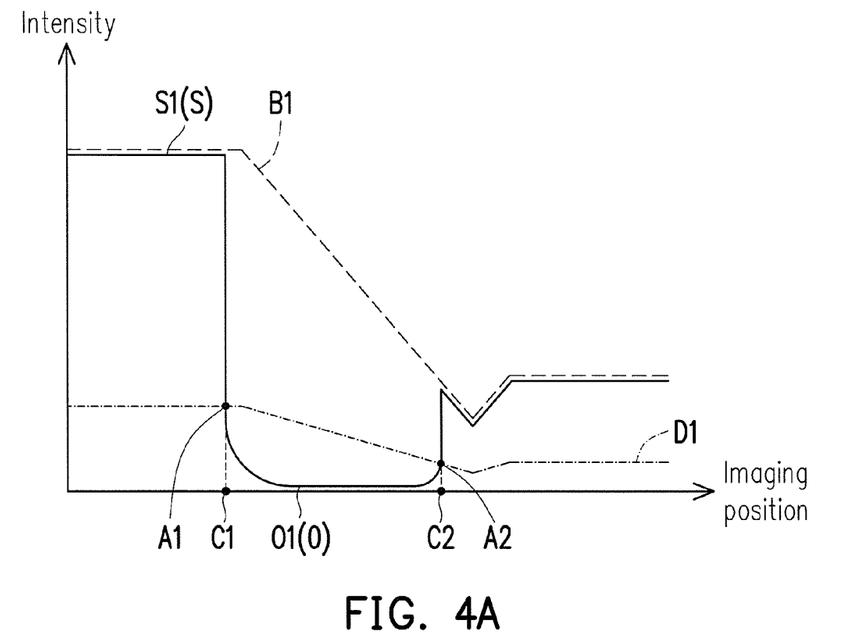
FIG. 4A and FIG. 4B respectively illustrate two image signals obtained through detection of two image sensors in FIG. 1.
Figure 4B:
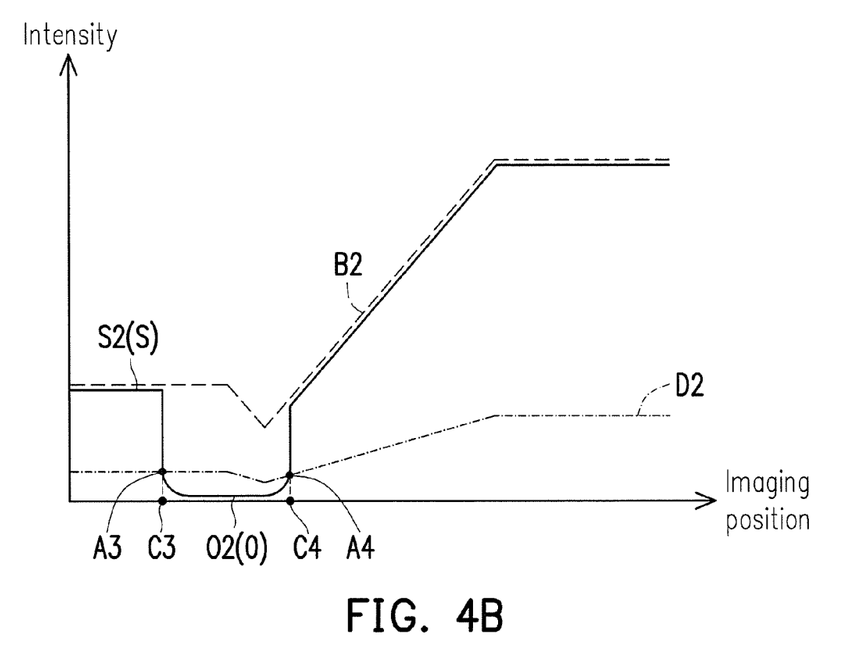

FIG. 1 is a schematic front view of a touch sensing module according to an embodiment of the disclosure. FIG. 2 is a schematic side view of the touch sensing module of FIG. 1. FIG. 3 is a schematic bottom view of an object used for touching in FIG. 1. FIG. 4A and FIG. 4B respectively illustrate two image signals obtained through detection of two image sensors in FIG. 1. With reference to FIG. 1, FIG. 2, FIG. 3, FIG. 4A, and FIG. 4B, a touch sensing module 200 of this embodiment is configured to be disposed beside a touch surface. In this embodiment, the touch surface is a display surface 110 (i.e. surface of a display region) of a display 100, for example. However, in other embodiments, the touch surface may be a desk surface, a board surface of an electronic whiteboard, a wall surface, a ground surface, or other suitable surfaces.

The touch sensing module 200 of this embodiment includes a plurality of image sensors 210 (e.g. image sensors 210a and 210b) and a processing unit 220. The image sensors 210 are disposed beside a reference plane R and are configured to detect the reference plane R along an extending direction of the reference plane R and converting a detection result into a plurality of image signals S (e.g. image signals S1 and S2) respectively. The processing unit 220 is configured to receive and process the image signals S from the image sensors 210. When an object 50 moves with respect to the reference plane R in a plurality of first times (i.e. frame times of the image sensors 210) and intersects or approaches the reference plane R in each of the first times, the processing unit 220 calculates imaging positions of two opposite borders of an object signal portion O of each image signal S on the corresponding image sensor 210, wherein the object signal portion O corresponds to the object 50.

In this embodiment, the touch sensing module 200 further includes at least one light emitting element 230 (two light emitting elements 230a and 230b are depicted in FIG. 1 as examples) configured to emit at least one detection light 232 (two detection lights 232a and 232b are depicted in FIG. 1 as examples) along the reference plane R. The object signal portion O of each image signal S corresponds to a dark region which is formed on the corresponding image sensor 210 when the object 50 blocks a portion of the detection light 232. More specifically, in this embodiment, the touch sensing module 200 further includes a reflective frame 240 disposed on a side of the reference plane R to reflect the detection light 232 from the light emitting element 230. When the object 50 is not on or near the reference plane R, the detection light 232 reflected by the reflective frame 240 becomes a background light detected by the image sensor 210, and this background light forms background signals B1 and B2 respectively on the image sensors 210a and 210b. When the object 50 approaches or intersects the reference plane R, the object 50 blocks a portion of the background light and forms two dark regions respectively on the image sensors 210a and 210b. The two dark regions respectively correspond to object signal portions O1 and O2, wherein the object signal portions O1 and O2 are portions where the signal subsides.

FIG. 4A is a schematic diagram of the image signal S1 from the image sensor 210a. FIG. 4B is a schematic diagram of the image signal S2 from the image sensor 210b. The imaging positions of two opposite borders A1 and A2 of the object signal portion O1 are imaging positions C1 and C2 respectively, and the imaging positions of two opposite borders A3 and A4 of the object signal portion O2 are imaging positions C3 and C4 respectively. In this embodiment, the borders A1 and A2 are defined as two intersection points where the object signal portion O1 intersects a signal D1 having an intensity that is ¼ of the background signal B1. The borders A3 and A4 are defined as two intersection points where the object signal portion O2 intersects a signal D2 having an intensity that is ¼ of the background signal B2. However, in other embodiments, intersection points of the object signal portions O1 and O2 and signals having intensities that are other multiples of the background signals B1 and B2 may be defined as the borders. The multiples may be designed according to the actual requirements.

Next, the processing unit 220 utilizes a triangulation location method to convert the imaging positions C1, C2, C3, and C4 of the borders A1, A2, A3, and A4 of the object signal portions O1 and O2 of the image signals S1 and S2 to positions of a plurality of first vertexes P1, P2, P3, and P4 of a first polygon Q1 that surrounds the object 50 on the reference plane R. For example, the imaging position C1 may correspond to a reference line L1 that extends at a specific detection angle of the image sensor 210a. The imaging position C2 may correspond to a reference line L2 that extends at another specific detection angle of the image sensor 210a. The imaging position C3 may correspond to a reference line L3 that extends at a specific detection angle of the image sensor 210b. The imaging position C4 may correspond to a reference line L4 that extends at another specific detection angle of the image sensor 210b. An intersection point of the reference lines L1 and L3 is the first vertex P1, an intersection point of the reference lines L1 and L4 is the first vertex P2, an intersection point of the reference lines L2 and L3 is the first vertex P3, and an intersection point of the reference lines L2 and L4 is the first vertex P4.

The processing unit 220 calculates lengths of a plurality of first diagonals (e.g. a first diagonal G1 and a first diagonal G2) of the first polygon Q1 based on the first vertexes P1 to P4. In this embodiment, the aforementioned image sensors 210 are two image sensors 210a and 210b, which are respectively disposed at two adjacent corners of the reference plane R, and the first polygon Q1 is a quadrilateral. Moreover, in this embodiment, the image sensor 210a and the light emitting element 230a may be integrated as an image detection module, and the image sensor 210b and the light emitting element 230b may be integrated as another image detection module. Herein, one of the first diagonal G1 and the first diagonal G2 corresponds to an extending direction (i.e. a longitudinal direction) of the object 50. The object 50 is for example a pen point of a touch pen 60 that is rod-shaped, as shown in FIG. 3. The processing unit 220 then determines which of the first diagonals G1 and G2 actually corresponds to the extending direction of the object 50.

FIG. 1 and FIG. 5A to FIG. 5C respectively illustrate motions of the object in different first times. With reference to FIG. 1 and FIG. 5A to FIG. 5C, the processing unit 220 selects the first diagonal G2 which has the least length variation in the first times from the first diagonals G1 and G2 in each first time (i.e. each frame time) as a first orientation diagonal corresponding to a real orientation of the object 50. More specifically, when the object 50 changes in sequence from the state of FIG. 1 to the states of FIG. 5A and FIG. 5B, the object 50 rotates clockwise on the reference plane R. Here, the length of the first diagonal G2 that corresponds to the extending direction of the object 50 does not vary much, but the length of the first diagonal G1 that does not correspond to the extending direction of the object 50 has a larger variation. After calculating the length variations of the first diagonals G1 and G2 in multiple frame times, the processing unit 220 selects the first diagonal G2 with less length variation (i.e. the least length variation) as the first orientation diagonal that corresponds to the extending direction of the object 50.

In this embodiment, the processing unit 220 calculates a plurality of orientation values of the first orientation diagonal (i.e. the first diagonal G2) in the first times (i.e. the frame times), wherein the orientation value may be an orientation angle or an orientation vector. In addition, in this embodiment, the processing unit 220 may execute a corresponding function according to the orientation values in the first times. For example, if the object 50 is used as a paintbrush, a color of the paintbrush may be changed by rotating the object 50 to different directions for painting lines of different colors. Accordingly, the user does not need to click to select different color blocks and can save time when changing the color of the paintbrush. Such an application is particularly convenient for a large-sized display or electronic whiteboard.

In this embodiment, the motion of the object 50 with respect to the reference plane R in the first times includes at least one of a rotation and a translation. For example, the change from the state of FIG. 1 through the state of FIG. 5A to the state of FIG. 5B is the rotation of the object 50. The change from the state of FIG. 5B to the state of FIG. 5C is the translation of the object 50. No matter the object 50 performs the rotation or the translation, the length of the first diagonal G2 corresponding to the extending direction of the object 50 hardly changes with the motion of the object 50, and thereby the processing unit 220 determines the real orientation of the object 50.

The processing unit 220 can not only infer a direction variation of the object 50 in the first times (frame times) but also continue to calculate the direction of the object 50 in a second time (i.e. a subsequent frame time) after the first times. Detailed descriptions are provided hereinafter.

Figure 5A:
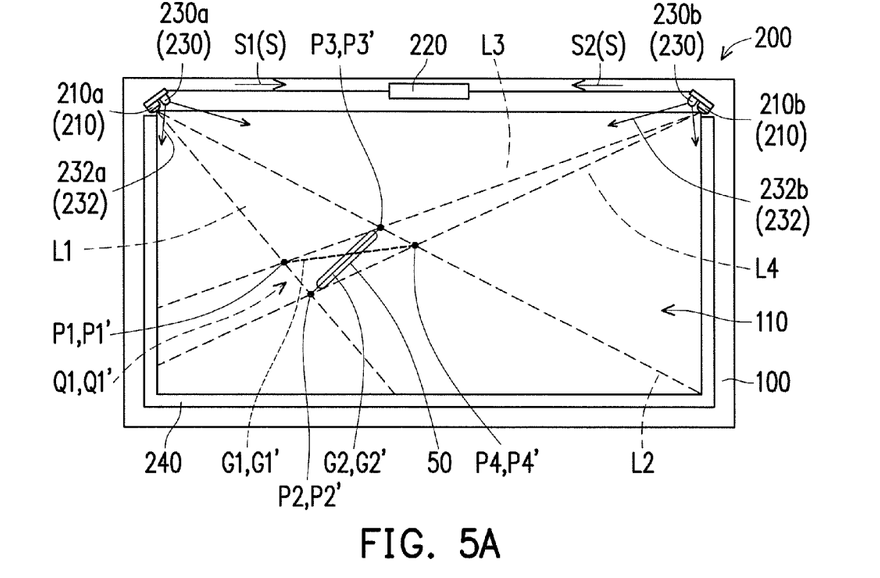
FIG. 5A to FIG. 5C illustrate motions of the object of FIG. 1 in different first times.
Figure 5B:
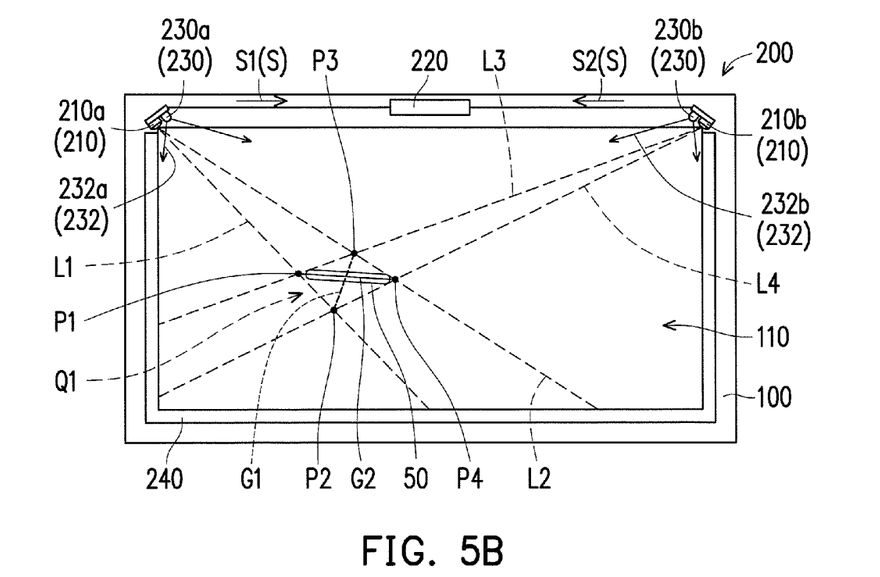
Figure 5C:
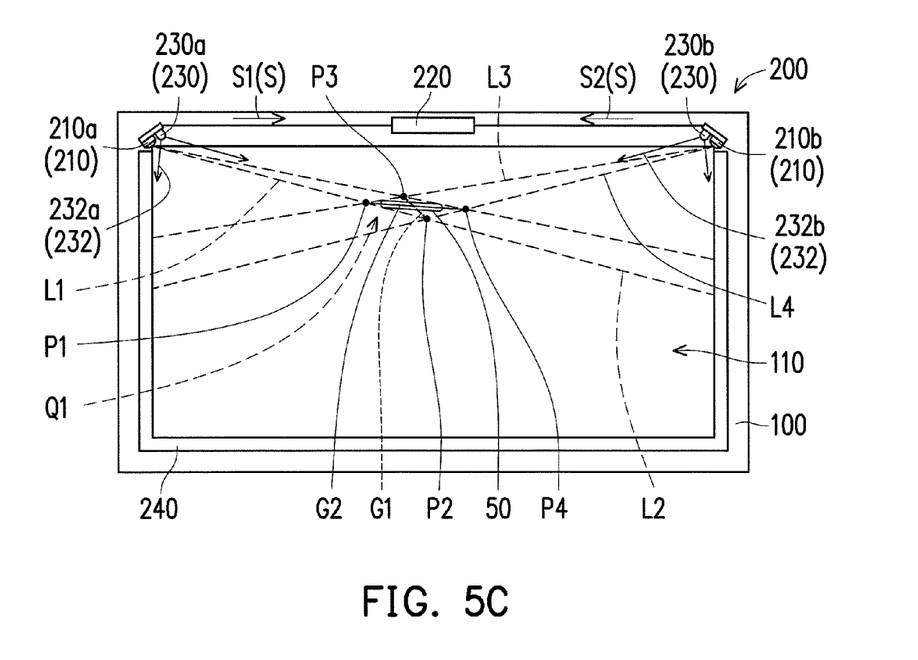

For example, after being in the states of FIG. 1, FIG. 5A, and FIG. 5B sequentially in the first times, the object 50 returns back to the state of FIG. 5A from the state of FIG. 5B in the second time. This example is given below for illustration; however, it should be noted that the disclosure is not limited thereto. In other situations, the object 50 may change from the state of FIG. 5B to any other state in the second time, such as in other orientations or positions. With reference to FIG. 5A, in this embodiment, when the object 50 intersects or approaches the reference plane R in the second time after the first times, the processing unit 220 calculates imaging positions (referring to the imaging positions C1 to C4 of FIG. 4A and FIG. 4B) of two opposite borders (referring to the borders A1 to A4 of FIG. 4A and FIG. 4B) of the object signal portion O, which corresponds to the object, of each image signal S on the corresponding image sensor 210, and utilizes a triangulation location method to convert the imaging positions of the borders of the object signal portions O of the image signals S to positions of a plurality of second vertexes P1', P2', P3', and P4' of a second polygon Q1' that surrounds the object on the reference plane R, thereby calculating lengths of a plurality of second diagonals G1' and G2' of the second polygon Q1'. The processing unit 220 selects the second diagonal G2' from the second diagonals G1' and G2' as a second orientation diagonal (i.e. the second diagonal G2') that corresponds to the real orientation of the object 50, for an absolute value of a difference between the length of the second diagonal G2' and the length of the first orientation diagonal (i.e. the first diagonal G2) is the least.

In this embodiment, the processing unit 220 calculates an orientation value of the second orientation diagonal (i.e. the second diagonal G2'), and the processing unit 220 executes a corresponding function according to the orientation value of the second orientation diagonal (i.e. the second diagonal G2') or according to the orientation value of the second orientation diagonal and the orientation values of at least part of the first orientation diagonals. For example, the processing unit 220 may execute the corresponding function according to the orientation value of the second orientation diagonal, or execute the corresponding function according to the variation of the orientation value from the first orientation diagonal to the second orientation diagonal in part of or all of the first times. More specifically, for example, the processing unit 220 executes the corresponding function according to the variation of the orientation values from the first orientation diagonals in several consecutive first times (not all) right before the second time to the second orientation diagonal in the second time, or executes the corresponding function according to the variation of the orientation values from the first orientation diagonals in all the first times to the second orientation diagonal in the second time. Herein, the orientation value may be an orientation angle or an orientation vector.

More specifically, the processing unit 220 obtains N data, which are (U1, V1), (U2, V2), . . . , and (UN, VN), respectively in N first times (i.e. N frame times), wherein the first value in the parentheses indicates the length value of the first diagonal G1 and the second value in the parentheses indicates the length value of the first diagonal G2, wherein N is a positive integer greater than or equal to 2. Next, the processing unit 220 may calculate absolute values of four differences, namely U2−U1, U2−V1, V2−U1, and V2−V1, and determine which of the four absolute values is the least. In this embodiment, V2−V1 has the least value. Therefore, it is determined that the first diagonal G2 in the first first time is the first orientation diagonal and that the first diagonal G2 in the second first time is the first orientation diagonal. In other embodiments, if U2−U1 has the least value, it is determined that the first diagonal G1 in the first first time is the first orientation diagonal and that the first diagonal G1 in the second first time is the first orientation diagonal; if U2−V1 has the least value, it is determined that the first diagonal G2 in the first first time is the first orientation diagonal and that the first diagonal G1 in the second first time is the first orientation diagonal; and if V2−U1 has the least value, it is determined that the first diagonal G1 in the first first time is the first orientation diagonal and that the first diagonal G2 in the second first time is the first orientation diagonal. Likewise, the processing unit 220 further calculates the absolute values of four differences, namely U3−U2, U3−V2, V3−U2, and V3−V2, and determines which of the four differences has the least absolute value, thereby selecting the corresponding first orientation diagonal. Accordingly, the processing unit 220 may further calculate the absolute values of the four differences, namely UN−U(N−1), UN−V(N−1), VN−U(N−1), and VN−V(N−1), and determines which of the four differences has the least absolute value, thereby selecting the corresponding first orientation diagonal. Herein, N is greater than or equal to 2. When N=2, the absolute values of the four differences, namely U2−U1, U2−V1, V2−U1, and V2−V1, are calculated to determine which of the four differences has the least absolute value, thereby selecting the corresponding first orientation diagonal. Next, in any frame time (i.e. the second time) after the N first times, the processing unit 220 obtains data of (U(N+K), V(N+K)), wherein K is a positive integer greater than or equal to 1. In the meantime, in this embodiment, the processing unit 220 may calculate absolute values of two differences, namely U(N+K)−VN and V(N+K)−VN (provided that a length of the first orientation diagonal in the Nth first time is VN) and determine which has the least value. If the absolute value of V(N+K)−VN is the least, it is determined that the second diagonal G2' corresponding to V(N+K) is the second orientation diagonal. In another embodiment, the processing unit 220 may calculate absolute values of length differences between two diagonals in each frame time and the diagonal serving as the orientation diagonal in the previous frame time to determine which diagonal in this frame time is the orientation diagonal, instead of finding orientation diagonals in two or more frame times for comparison. Nevertheless, the disclosure is not limited thereto.

In the touch sensing module 200 of this embodiment, because the first diagonal having the least length variation in the first times among the first diagonals in each first time is selected as the first orientation diagonal corresponding to the real orientation of the object 50, the orientation of the object 50 used for touching can be determined accurately. Accordingly, the touch sensing module 200 of this embodiment achieves various and more convenient applications. Moreover, in the touch sensing module 200 of this embodiment, the processing unit 220 selects one of the second diagonals G1' and G2' as the second orientation diagonal corresponding to the real orientation of the object 50 according to that the absolute value of the difference between the length of the selected second diagonal and the length of the first orientation diagonal is the least. Therefore, the touch sensing module 200 is capable of quickly and instantly determining the next orientation variation of the object 50 to achieve various and more convenient applications with high efficiency.

In this embodiment, the touch sensing module 200 is a blocking optical touch sensing module, for example. However, in other embodiments, the touch sensing module 200 may be a reflective optical touch sensing module, wherein the object 50 reflects a portion of the detection light 232 to the image sensor 210 to form a bright region thereon, and the object signal portion O of each image signal corresponds to the bright region formed on the image sensor 210. In other words, the object signal portion O is a protrusion portion of the image signal, and the touch sensing module 200 may not include the reflective frame 240, or the reflective frame 240 may be replaced by a light dissipation frame.

Figure 6:
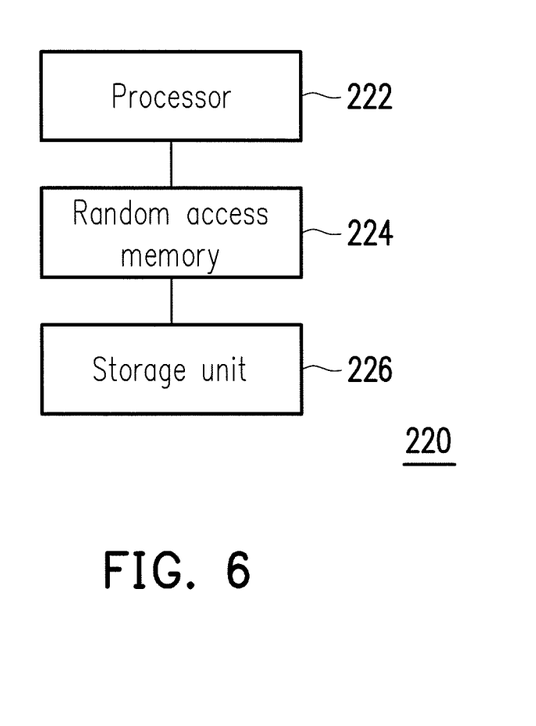
FIG. 6 is a block diagram of a processing unit of FIG. 1.

FIG. 6 is a block diagram of the processing unit of FIG. 1. With reference to FIG. 1 and FIG. 6, in this embodiment, the processing unit 220 is a micro-controller unit, for example, which includes a processor 222 electrically connected to the image sensors 210, a random access memory (RAM) 224 electrically connected to the processor 222, and a storage unit 226 electrically connected to the random access memory 224, wherein the storage unit 226 may be a flash memory or a read only memory (ROM), for example. The storage unit 226 is configured to store a program command (i.e. code) for executing the steps of the processing unit 220. When the processing unit 220 is operating, the random access memory 224 loads the program command in the storage unit 226, and the processor 222 further loads the program command in the random access memory 224 to execute the corresponding steps. In another embodiment, the touch sensing module 200 may be integrated with a computer (e.g. a personal computer, a tablet computer, or a smart phone). That is, the processor 222 may be a CPU in the computer, the random access memory 224 may be a random access memory in the computer, and the storage unit 226 may be a hard disk, such as hard drive or solid state drive, in the computer. In other words, the command executed by the processing unit 220 may be implemented in the form of software. However, in other embodiments, the processing unit 220 may be a digital logic circuit. That is, the processing unit 220 may implement operation of the command in the form of hardware.

Figure 7:
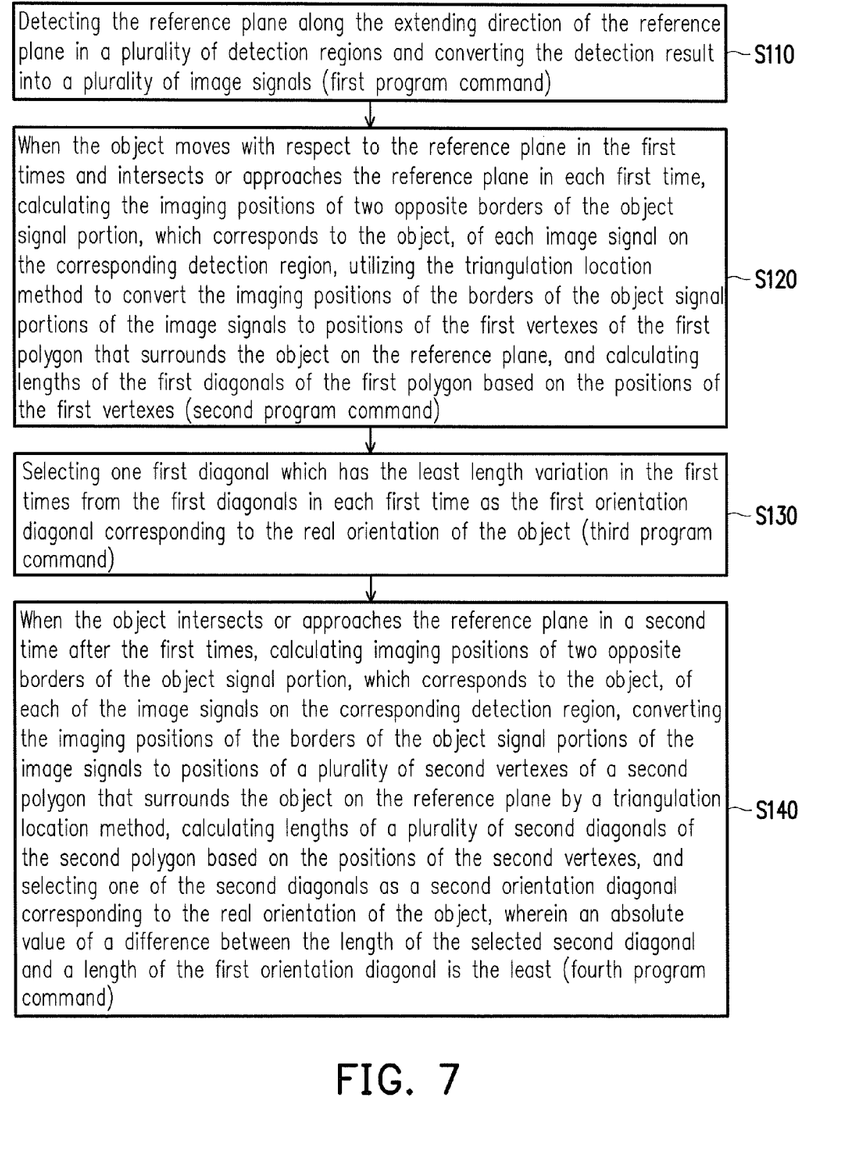
FIG. 7 is a flowchart of a touch sensing method and a computer program product according to an embodiment of the disclosure.

FIG. 7 is a flowchart of a touch sensing method and a computer program product according to an embodiment of the disclosure. With reference to FIG. 1, FIG. 5A, and FIG. 7, the computer program product of this embodiment may enable the processing unit 220 of FIG. 1 to execute the aforementioned steps. The touch sensing method of this embodiment may be a method generated during execution of the processing unit 220 of FIG. 1. The computer program product of this embodiment may be stored in a computer readable recording medium (such as hard drive, CD-ROM, flash memory, read only memory, or other memory cells) for detecting a touch action of the object 50. The computer program product of this embodiment is the code stored in the storage unit 226 of FIG. 6, for example. The touch sensing method (or the computer program product) of this embodiment includes performing Step S110 (or a first program command), Step S120 (or a second program command), Step S130 (or a third program command), and Step S140 (or a fourth program command) in sequence. Step S110 (or the first program command) is to detect the reference plane R along the extending direction of the reference plane R in a plurality of detection regions (i.e. regions where the image sensors 210 are located in FIG. 1) and convert the detection result into a plurality of image signals S respectively. Step S120 (or the second program command) includes, when the object 50 moves with respect to the reference plane R in the first times and intersects or approaches the reference plane R in each first time, calculating the imaging positions of two opposite borders of the object signal portion O, which corresponds to the object 50, of each image signal S on the corresponding detection region, and utilizing the triangulation location method to convert the imaging positions of the borders of the object signal portions O of the image signals S to positions of the first vertexes P1 to P4 of the first polygon Q1 that surrounds the object 50 on the reference plane R, thereby calculating lengths of the first diagonals G1 and G2 of the first polygon Q1. Step S130 (or the third program command) is to select one first diagonal which has the least length variation in the first times from the first diagonals G1 and G2 in each first time as the first orientation diagonal corresponding to the real orientation of the object 50. Step S140 (or the fourth program command) includes, when the object 50 intersects or approaches the reference plane R in the second time after the first times, calculating imaging positions of two opposite borders of the object signal portion O, which corresponds to the object 50, of each image signal S on the corresponding detection region, and utilizing the triangulation location method to convert the imaging positions of the borders of the object signal portions O of the image signals S to the positions of the second vertexes P1' to P4' of the second polygon Q1' that surrounds the object 50 on the reference plane R, thereby calculating the lengths of the second diagonals G1' and G2' of the second polygon Q1' and selecting one of the second diagonals G1' and G2' as the second orientation diagonal corresponding to the real orientation of the object 50, wherein the absolute value of the difference between the length of the selected second diagonal and the length of the first orientation diagonal is the least.

Detailed steps and program commands of the touch sensing method and the computer program product in this embodiment or other embodiments are the same as those executed by the processing unit 220 in the embodiment of FIG. 1 and thus will not be repeated again here. In addition, the touch sensing method and the computer program product of this embodiment also achieve the advantages and effects of the touch sensing module of the embodiment of FIG. 1. Therefore, details thereof will not be repeated here.

To sum up, according to the touch sensing module, touch sensing method, and computer program product of the embodiments of the disclosure, because the first diagonal having the least length variation in the first times among the first diagonals in each first time is selected as the first orientation diagonal corresponding to the real orientation of the object, the orientation of the object used for touching can be determined accurately. Accordingly, the touch sensing module, touch sensing method, and computer program product of the embodiments of the disclosure achieve various and more convenient applications.

It will be apparent to those skilled in the art that various modifications and variations can be made to the disclosed embodiments without departing from the scope or spirit of the disclosure. In view of the foregoing, it is intended that the disclosure covers modifications and variations of this disclosure provided that they fall within the scope of the following claims and their equivalents.

What is claimed is:

1. A touch sensing module, comprising:
a plurality of image sensors disposed beside a reference plane and configured to detect the reference plane along an extending direction of the reference plane and convert a detection result into a plurality of image signals; and
a processing unit configured to receive and process the image signals from the image sensors, wherein, when an object moves with respect to the reference plane in a plurality of first times and intersects or approaches the reference plane in each of the first times, the processing unit calculates imaging positions of two opposite borders of an object signal portion, which corresponds to the object, of each of the image signals on the corresponding image sensor, converts the imaging positions of the borders of the object signal portions of the image signals to positions of a plurality of first vertexes of a first polygon that surrounds the object on the reference plane by a triangulation location method, and calculates lengths of a plurality of first diagonals of the first polygon based on the positions of the first vertexes, and the processing unit selects one first diagonal which has the least length variation in the first times from the first diagonals in each of the first times as a first orientation diagonal corresponding to a real orientation of the object.

2. The touch sensing module according to claim 1, wherein a motion of the object with respect to the reference plane in the first times comprises at least one of a rotation and a translation.

3. The touch sensing module according to claim 1, wherein the processing unit calculates a plurality of orientation values of the first orientation diagonal in the first times.

4. The touch sensing module according to claim 3, wherein the processing unit executes a corresponding function according to the orientation values in the first times.

5. The touch sensing module according to claim 1, wherein, when the object intersects or approaches the reference plane in a second time after the first times, the processing unit calculates imaging positions of two opposite borders of the object signal portion, which corresponds to the object, of each of the image signals on the corresponding image sensor, converts the imaging positions of the borders of the object signal portions of the image signals to positions of a plurality of second vertexes of a second polygon that surrounds the object on the reference plane by a triangulation location method, and calculates lengths of a plurality of second diagonals of the second polygon based on the positions of the second vertexes, and the processing unit selects one of the second diagonals as a second orientation diagonal corresponding to the real orientation of the object, wherein an absolute value of a difference between the length of the selected second diagonal and a length of the first orientation diagonal is the least.

6. The touch sensing module according to claim 5, wherein the processing unit calculates an orientation value of the second orientation diagonal, and the processing unit executes a corresponding function according to the orientation value of the second orientation diagonal or according to the orientation value of the second orientation diagonal and the orientation values of at least part of the first orientation diagonals.

7. The touch sensing module according to claim 1, wherein the image sensors are two image sensors which are respectively disposed at two adjacent corners of the reference plane, and the first polygon is a quadrilateral.

8. The touch sensing module according to claim 1, further comprising at least one light emitting element which emits at least one detection light along the reference plane, wherein the object signal portion of each of the image signals corresponds to a dark region which is formed on the corresponding image sensor when the object blocks a portion of the at least one detection light, or the object signal portion of each of the image signals corresponds to a bright region that is formed on the image sensor when the object reflects a portion of the at least one detection light to the image sensor.

9. A touch sensing method, comprising:
- detecting a reference plane along an extending direction of the reference plane in a plurality of detection regions and converting a detection result into a plurality of image signals respectively;
- when an object moves with respect to the reference plane in a plurality of first times and intersects or approaches the reference plane in each of the first times, calculating imaging positions of two opposite borders of an object signal portion, which corresponds to the object, of each of the image signals on the corresponding detection region, converting the imaging positions of the borders of the object signal portions of the image signals to positions of a plurality of first vertexes of a first polygon that surrounds the object on the reference plane by a triangulation location method, and calculating lengths of a plurality of first diagonals of the first polygon based on the positions of the first vertexes; and
- selecting one first diagonal which has the least length variation in the first times from the first diagonals in each of the first time as a first orientation diagonal corresponding to a real orientation of the object.

10. The touch sensing method according to claim 9, wherein a motion of the object with respect to the reference plane in the first times comprises at least one of a rotation and a translation.

11. The touch sensing method according to claim 9, further comprising calculating a plurality of orientation values of the first orientation diagonal in the first times.

12. The touch sensing method according to claim 11, further comprising executing a corresponding function according to the orientation values in the first times.

13. The touch sensing method according to claim 9, further comprising:
- when the object intersects or approaches the reference plane in a second time after the first times, calculating imaging positions of two opposite borders of the object signal portion, which corresponds to the object, of each of the image signals on the corresponding detection region, converting the imaging positions of the borders of the object signal portions of the image signals to positions of a plurality of second vertexes of a second polygon that surrounds the object on the reference plane by a triangulation location method, calculating lengths of a plurality of second diagonals of the second polygon based on the positions of the second vertexes, and selecting one of the second diagonals as a second orientation diagonal corresponding to the real orientation of the object, wherein an absolute value of a difference between the length of the selected second diagonal and a length of the first orientation diagonal is the least.

14. The touch sensing method according to claim 13, further comprising:
- calculating an orientation value of the second orientation diagonal; and
- executing a corresponding function according to the orientation value of the second orientation diagonal or according to the orientation value of the second orientation diagonal and the orientation values of at least part of the first orientation diagonals.

15. The touch sensing method according to claim 9, wherein the detection regions are two detection regions which are respectively disposed at two adjacent corners of the reference plane, and the first polygon is a quadrilateral.

16. The touch sensing method according to claim 9, further comprising:
- emitting at least one detection light along the reference plane, wherein the object signal portion of each of the image signals corresponds to a dark region which is formed on the corresponding detection region when the object blocks a portion of the at least one detection light, or the object signal portion of each of the image signals corresponds to a bright region that is formed on the detection region when the object reflects a portion of the at least one detection light to the detection region.

17. A non-transitory computer readable recording medium having stored thereon a computer program product which, when executed by a processor, causes the processor to perform the steps of:
- detecting a reference plane along an extending direction of the reference plane in a plurality of detection regions and converting a detection result into a plurality of image signals respectively;
- calculating imaging positions of two opposite borders of an object signal portion, which corresponds to the object, of each of the image signals on the corresponding detection region, converting the imaging positions of the borders of the object signal portions of the image signals to positions of a plurality of first vertexes of a first polygon that surrounds the object on the reference plane by a triangulation location method, and calculating lengths of a plurality of first diagonals of the first polygon based on the positions of the first vertexes when the object moves with respect to the reference plane in a plurality of first times and intersects or approaches the reference plane in each of the first times; and
- selecting one first diagonal which has the least length variation in the first times from the first diagonals in each of the first time as a first orientation diagonal corresponding to a real orientation of the object.

18. The non-transitory computer readable recording medium having stored thereon the computer program product according to claim 17, wherein a motion of the object with respect to the reference plane in the first times comprises at least one of a rotation and a translation.

19. The non-transitory computer readable recording medium having stored thereon the computer program product according to claim 17, which further causes the processor to perform the step of calculating a plurality of orientation values of the first orientation diagonal in the first times.

20. The non-transitory computer readable recording medium having stored thereon the computer program product according to claim 19, which further causes the processor to perform the step of executing a corresponding function according to the orientation values in the first times.

21. The non-transitory computer readable recording medium having stored thereon the computer program product according to claim 17, which further causes the processor to perform the steps of:
- calculating imaging positions of two opposite borders of the object signal portion, which corresponds to the object, of each of the image signals on the corresponding detection region, converting the imaging positions of the borders of the object signal portions of the image signals to positions of a plurality of second vertexes of a second polygon that surrounds the object on the reference plane by a triangulation location method, calculating lengths of a plurality of second diagonals of the second polygon based on the positions of the second vertexes, and selecting one of the second diagonals as a second orientation diagonal corresponding to the real orientation of the object, wherein an absolute value of a difference between the length of the selected second diagonal and a length of the first orientation diagonal is the least, when the object intersects or approaches the reference plane in a second time after the first times.

22. The non-transitory computer readable recording medium having stored thereon the computer program product according to claim 21, which further causes the processor to perform the steps of:
    calculating an orientation value of the second orientation diagonal; and
    executing a corresponding function according to the orientation value of the second orientation diagonal or according to the orientation value of the second orientation diagonal and the orientation values of at least part of the first orientation diagonals.

23. The non-transitory computer readable recording medium having stored thereon the computer program product according to claim 17, wherein the detection regions are two detection regions which are respectively disposed at two adjacent corners of the reference plane, and the first polygon is a quadrilateral.

24. The non-transitory computer readable recording medium having stored thereon the computer program product according to claim 17, which further causes the processor to perform the step of:
    emitting at least one detection light along the reference plane, wherein the object signal portion of each of the image signals corresponds to a dark region which is formed on the corresponding detection region when the object blocks a portion of the at least one detection light, or the object signal portion of each of the image signals corresponds to a bright region that is formed on the detection region when the object reflects a portion of the at least one detection light to the detection region.

* * * * *